(12) United States Patent
Ruan

(10) Patent No.: US 8,043,037 B2
(45) Date of Patent: Oct. 25, 2011

(54) CARGO BRACE AND RELEASE DEVICE

(75) Inventor: Bu Qin Ruan, Zhi Jiang (CN)

(73) Assignee: Zhejiang Topsun Logistic Control Co., Ltd, Zhejiang (CN)

( * ) Notice: Subject to any disclaimer, the term of this patent is extended or adjusted under 35 U.S.C. 154(b) by 0 days.

(21) Appl. No.: 11/807,260

(22) Filed: May 24, 2007

(65) Prior Publication Data

US 2008/0025809 A1     Jan. 31, 2008

Related U.S. Application Data

(60) Provisional application No. 60/808,206, filed on May 24, 2006.

(51) Int. Cl.
*B60P 7/08* (2006.01)

(52) U.S. Cl. .......................... 410/151; 410/143

(58) Field of Classification Search .................. 410/143, 410/145, 151; 211/105.3; 248/354.6, 354.7; 254/12, 95, 108, 112; 74/141.5, 167, 169

See application file for complete search history.

(56) References Cited

U.S. PATENT DOCUMENTS 3,090,600 A * 5/1963 Smith ........................... 410/151
3,352,539 A * 11/1967 Witt ................................ 410/23
5,472,301 A * 12/1995 Wallen .......................... 410/151

* cited by examiner

*Primary Examiner* — Stephen Gordon
(74) *Attorney, Agent, or Firm* — Bergman & Song LLP; Michael Bergman

(57) ABSTRACT

A cargo brace device includes a drive mechanism that allows rapid release of operative forces as well as rapid assembly and disassembly of the cargo brace. Activation of a release lever allows rapid disengagement of ratchet pawls from a toothed rack to allow first and second longitudinal members of the cargo brace to readily move axially in relation to one another.

7 Claims, 20 Drawing Sheets

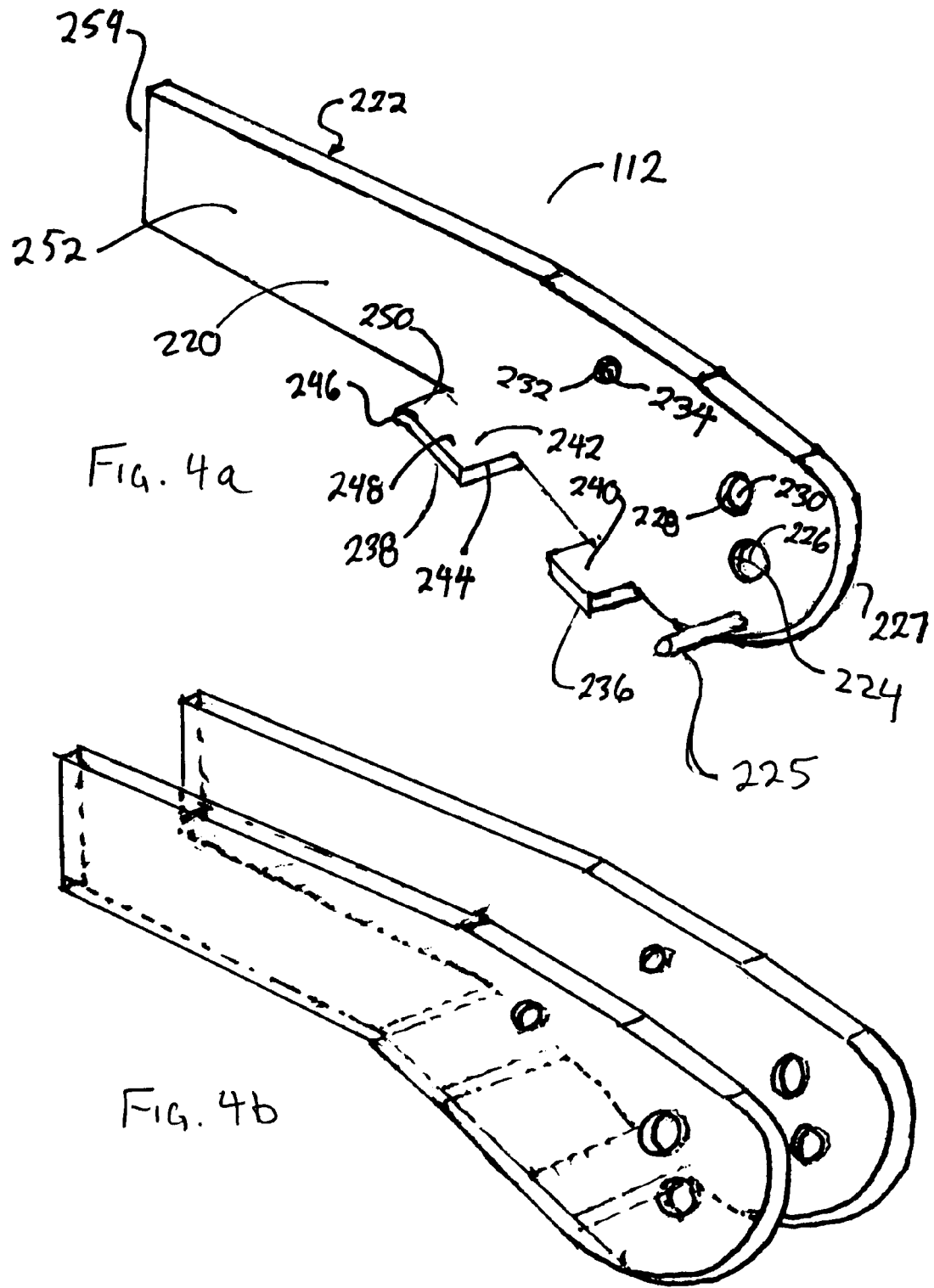

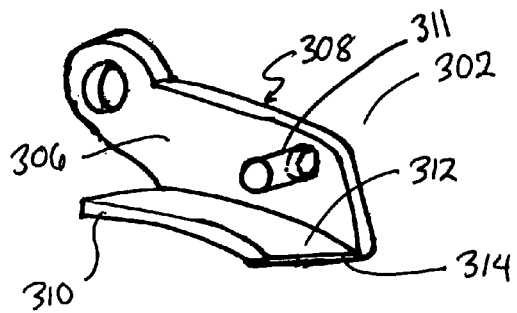
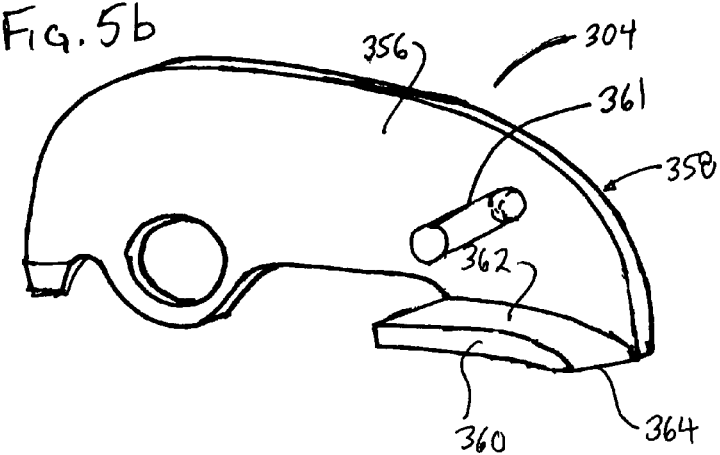
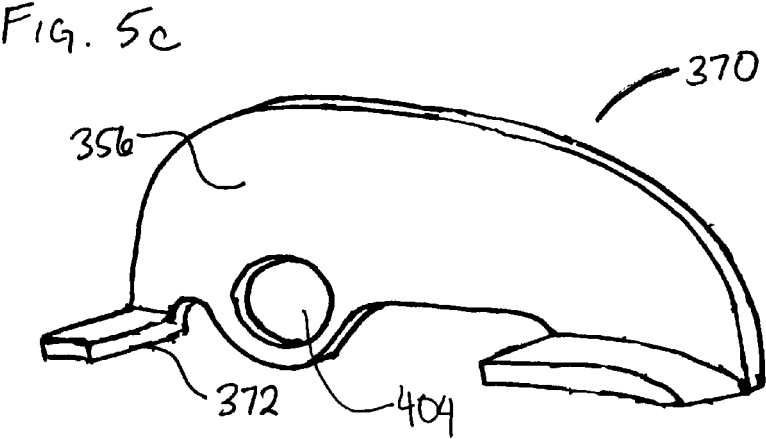

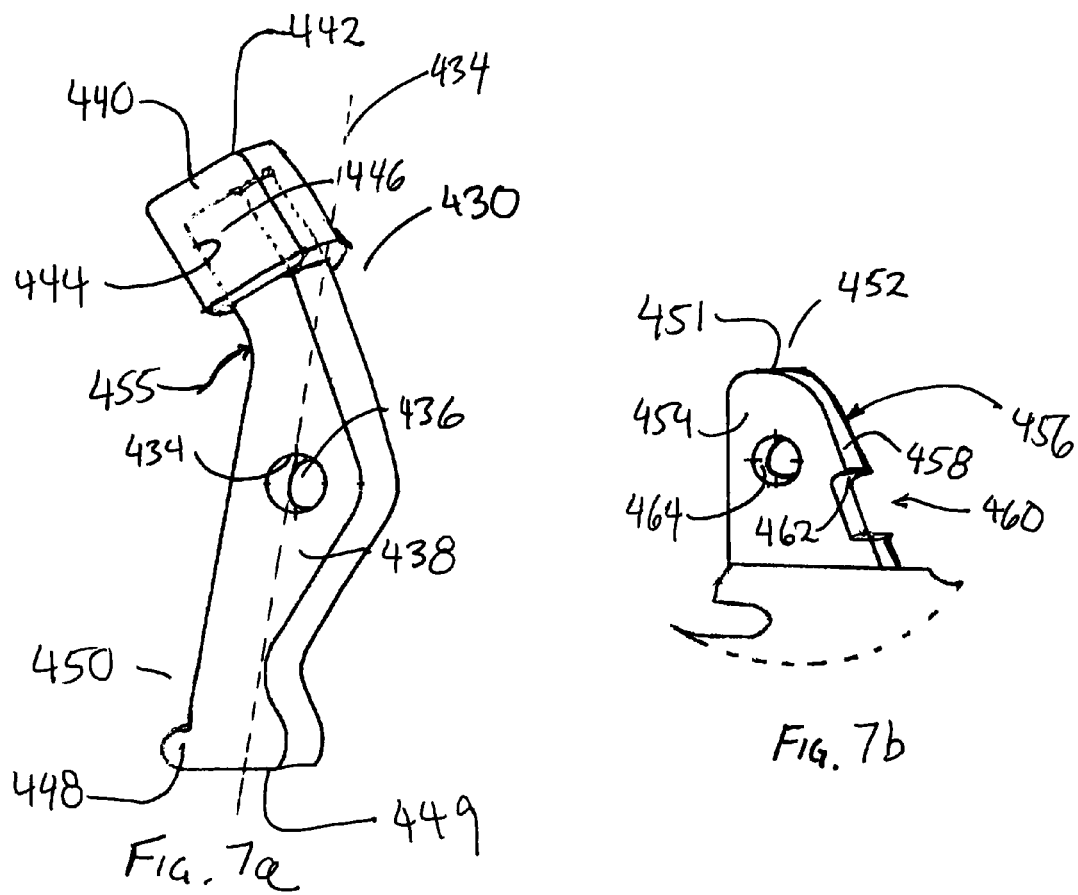
Fig. 7a
Fig. 7b
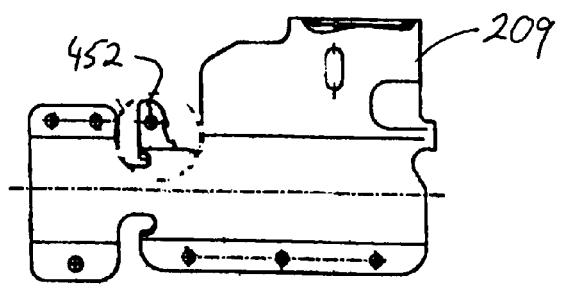
Fig 7c

CARGO BRACE AND RELEASE DEVICE

CROSS-REFERENCE TO RELATED APPLICATIONS

The present application claims the benefit of U.S. provisional patent application No. 60/808,206 filed on May 24, 2006, the disclosure of which is herewith incorporated by reference in its entirety.

FIELD OF THE INVENTION

The present invention relates to a load restraining device adapted to limit the shifting of cargo within a vehicle, and more particularly to load retaining device for rapid installation and removal.

BACKGROUND

Goods in transportation, and in storage, are variously referred to by the terms cargo and freight, among others. These terms are used interchangeably in this application. The transportation of freight is accomplished using assorted vehicles including, for example, airplanes, ships, railroad cars, and automobiles of various configurations such as, for example, tractor trailers, cargo vans and pickup trucks. In addition, it is known to transport freight in shipping containers that are adapted to be carried by any of the above-listed modes of transportation, as well as others, and to be moved between vehicles using cranes, jacks, and specialized lifting equipment. Because of the accelerations experienced within a moving vehicle or shipping container there is a tendency for freight to shift position over time, relative to surrounding walls. Indeed, even externally induced vibrations can cause such shifting within a stationary vehicle or storage facility. Accordingly, various means are employed to stabilize and retain freight in position relative to its immediate surroundings.

In this context, it is known use cargo bars to stabilize freight. Such cargo bars are generally adapted to be coupled to the walls of a freight storage compartment, such as a vehicle compartment, and to have bearing surfaces adapted to impinge on the freight and hold it in position. One means of coupling a cargo bar to the walls of a freight storage compartment is to expand the bar, so as to place it in compression and allow friction between ends of the bar and respective regions of the surrounding walls to prevent motion of the bar and consequently prevent motion of the restraint freight. It has been suggested that screws, rack and pinion devices, hydraulic devices, and ratcheting devices are adaptable to placing a cargo bar in compression. Ratcheting devices are presented, for example, in U.S. Pat. No. 923,463, to Taylor, which shows a Car Brace including a plurality of ratchet pawls, and in U.S. Pat. No. 3,995,565, to Kersey, which shows an Extensible Telescoping Cargo Brace employing a vehicle ratchet-type bumper jack. An exemplary bumper jack is shown in U.S. Pat. No. 4,281,820 to Martin. Rack and pinion devices are presented, for example, in U.S. Pat. No. 5,094,576 to Fredelius and in U.S. Pat. Nos. 4,669,934 and 4,781,499 to Wisecarver.

It is clear that the problem of retaining shifting freight has thus been addressed by many inventors, doubtless some of great creativity, over a long period of time. Indeed the Taylor patent was filed over a hundred years before the present date. Despite the long-felt need for effective cargo bracing, illustrated by these many efforts, and the creativity applied by many inventors seeking to address these needs, none until now none has appreciated the problem of freight retention in the way that the present inventors have done, nor evidenced such appreciation by creating the novel and surprisingly useful methods and apparatus of the present invention. In the face of this long-felt need, the present inventor has now perceived new aspects of, and solved, the problem of providing an effective cargo brace and release device.

SUMMARY

The present invention includes a cargo brace having a readily disengagable drive mechanism including a release device. In one embodiment, the drive mechanism includes a readily disengageable ratchet device. According to one aspect of the invention, the readily disengageable ratchet device is adapted to rapidly release compressive forces within the cargo bar so as to allow removal of the cargo bar from a deployed position. In another aspect of the invention, the readily disengageable ratchet device is adapted to allow rapid assembly and/or disassembly of the cargo bar into two or more component pieces. In one embodiment, the invention includes a cargo bar kit including two or more cargo bar component pieces and, in one embodiment, a storage portion. In one embodiment, the storage portion includes a storage bag.

These and other advantages and features of the invention will be more readily understood in relation to the following detailed description of the invention, which is provided in conjunction with the accompanying drawings.

BRIEF DESCRIPTION OF THE DRAWINGS

FIG. 4a shows, in perspective view, a portion of a handle for a cargo bar according to one embodiment of the invention;

FIG. 4b shows, in perspective view, a further portion of a handle for a cargo bar according to one embodiment of the invention;

FIG. 5a shows, in perspective view, a portion of a holding pawl for a cargo bar according to one embodiment of the invention;

FIG. 5b shows, in perspective view, a portion of a driving pawl for a cargo bar according to a further embodiment of the invention;

FIG. 5c shows, in perspective view, a portion of a driving pawl for a cargo bar according to another embodiment of the invention;

FIG. 7a shows, in perspective view, a portion of a stopping lever for a cargo bar according to one embodiment of the invention;

FIG. 7b shows, in perspective view, a portion of a detent pedestal according to one embodiment of the invention;

FIG. 7c shows a housing component of a device according to certain exemplary aspects of the invention;

DETAILED DESCRIPTION

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details.

Figure 1:
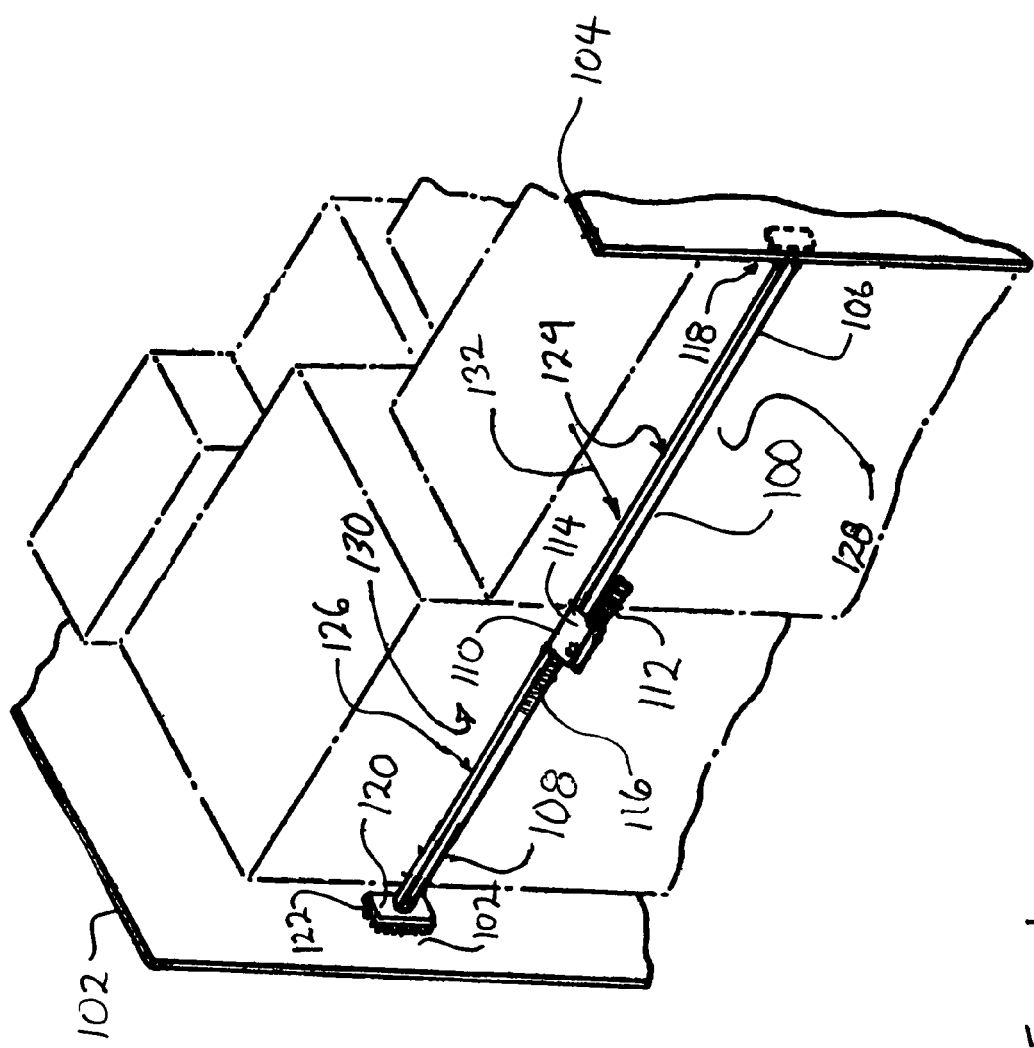
FIG. 1 shows, a cargo bar deployed between supporting walls according to one embodiment of the invention.

FIG. 1 shows a cargo bar 100 according to one embodiment of the invention. As illustrated, the cargo bar is deployed between first 102 and second 104 supporting walls of a storage container, such as the supporting walls of a tractor-trailer truck cargo compartment.

In the illustrated embodiment, the cargo bar 100 includes first 106 and second 108 longitudinal members. A mechanical drive portion 110 is substantially fixedly coupled to the first longitudinal member 106. The mechanical drive portion 110 includes an operating handle 112 pivotally coupled to a sidewall portion 114 of the mechanical drive portion 110. In the illustrated embodiment, the second longitudinal member 108 includes a coupling portion 116 such as a toothed region, or rack. According to the illustrated embodiment, the coupling portion 116 is adapted to cooperate with the drive portion 110 to urge the first 106 and second 108 longitudinal members outwardly with respect to one another.

The illustrated embodiment of the cargo bar 100 includes first 118 and second 120 coupling feet. In various embodiments, each coupling foot includes a frictional sole 122. The frictional sole is adapted to grip internal surface region 124 of a respective supporting wall (e.g., 102).

When deployed as shown, respective supporting surfaces 124, 126 of longitudinal members 106, 108 are deployed in a substantially vertical orientation and in proximity to corresponding surface regions 128, 130 of cargo such as, for example, cardboard cartons. Lateral forces 132 imposed by acceleration of the cargo relative to the supporting walls 102, 104 are transferred to the supporting surfaces 124, 126 of the longitudinal members 106, 108. These forces are consequently transferred through the longitudinal members to the frictional soles (e.g., 122), and from there to the supporting walls 102, 104. The structural integrity of the supporting walls allows them to resist the transferred forces 132 and hold the cargo in place.

Figure 2:
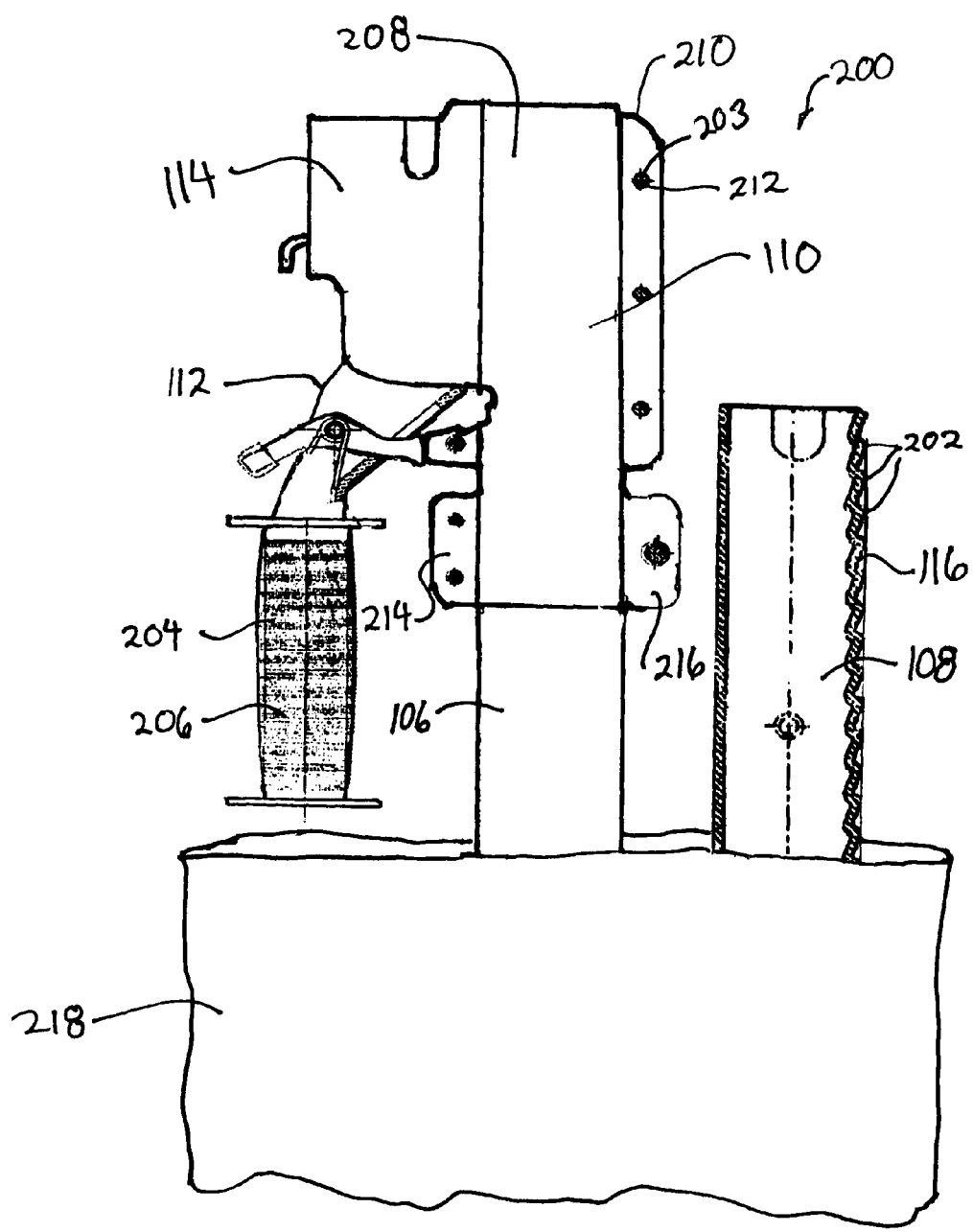
FIG. 2 shows a portion of a cargo bar kit according to one embodiment of the invention.

FIG. 2 shows a portion of a cargo brace kit 200 according to one exemplary embodiment of the invention. The kit includes a first longitudinal member 106 and a second longitudinal member 108. The second longitudinal member 108 has a coupling portion 116. In the illustrated embodiment, the coupling portion 116 includes a rack surface portion of the longitudinal member 108. According to the illustrated embodiment, the rack surface portion includes a plurality of teeth 202, each adapted to cooperate with a ratchet pawl.

A drive portion 110 is firmly coupled to the first longitudinal member 106. In one embodiment of the invention, drive portion 110 is coupled to a longitudinal member 106 by a frictional clamping between an inner surface region of a drive portion 110 and a corresponding outer surface region of longitudinal member 106.

In the illustrated embodiment, the drive portion 110 includes an operating handle 112. As will be discussed in additional detail below, the operating handle 112 is pivotally coupled to a sidewall 114 of the drive portion 110. Also shown in the illustrated embodiment is a grip 204. The grip 204 has an internal surface defining a cavity therewithin. The cavity is adapted to receive a portion of the handle 112 therewithin. An external surface 206 is configured and adapted to be readily grasped, and securely held, by an operator of the cargo brace.

According to one embodiment of the invention, the drive portion 110 includes first 208 and second housing components 209. Each housing component includes an assembly flange portion 210, 211 having a fastener hole 212. In the illustrated embodiment, a fastener 203 is disposed within fastener hole 212 to retain the first and second housing components in proximity to one another. The fastener is, in various embodiments, a machine screw, a nut and bolt combination, a conventional rivet, a tubular rivet, and a pop rivet.

Also, according to the illustrated embodiment, the housing components include respective clamping flanges (e.g., 214, 216). These clamping flanges when coupled to respective opposite members by respective fasteners such as, for example, screws, serve to secure the drive portion 110 to longitudinal member 106.

As is further illustrated, the kit 200 includes a carrier 218. In the illustrated embodiment, the carrier 218 is a bag such as, for example, a bag form of a textile material. The carrier is adapted to contain and support the first and second longitudinal members 106, 108 and the drive portion 110 when the cargo brace is not in use. In one embodiment, the carrier includes a woven textile material. In one embodiment, the carrier includes a woven natural polymer textile material. In one embodiment, the carrier includes a woven synthetic polymer textile material. In other embodiments, the carrier 218 includes, respectively, a non-woven textile material, a molded polymer material, a fabricated polymer material, a metallic material and a cellulose-based material.

Figure 3:
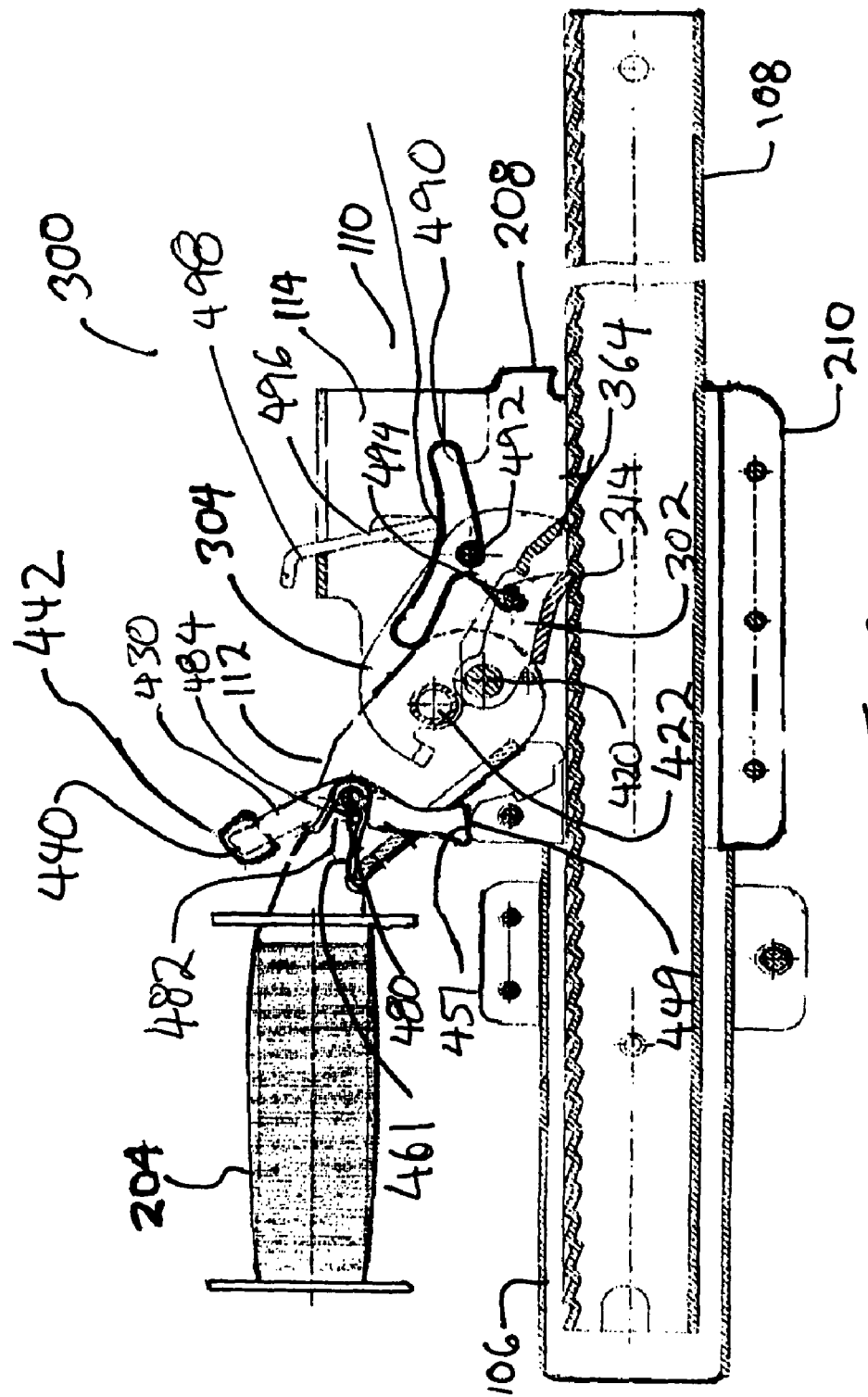
FIG. 3 shows, in cross-sectional view, a portion of a cargo bar according to one embodiment of the invention.

FIG. 3 shows a further portion of an exemplary cargo brace 300 in additional detail, including various components revealed by cross-sectional representation.

The FIG. 3 embodiment shows a portion of a first longitudinal member 106 and a portion of a second longitudinal member 108. The first longitudinal member 106 is coupled to a mechanical drive portion 110. Various components of the mechanical drive portion 110 are illustrated including a housing component 208 with a sidewall portion 114, an assembly flange portion 210, and two clamping flanges 214, 216. Also shown are an operating handle 112 and a grip 204.

FIG. 4a shows, in additional detail, a handle 112 for a cargo bar according to one embodiment of the invention. As shown, the handle 112 includes a first substantially planar surface region 220. A second substantially planar surface region 222 is disposed in substantially parallel spaced relation to the first surface region 220. In the illustrated embodiment, a first internal bearing surface 224 defines a first through-hole 226 between the first 220 and second 222 surface regions. The first through-hole 226 is disposed in proximity to a forward end 227 of the handle 112. A second internal bearing surface 228 defines a first through-hole 230 between the first 220 and second 222 surface regions, and a third internal bearing surface 232 defines a third through-hole 234 between the surface regions 220 and 222. A lifting shaft 225 is disposed substantially perpendicular to surface 220. The lifting shaft 225 is, in various embodiments, a rivet, a roll pin, a screw, a welded dowel, or any other configuration of mechanism and apparatus adapted to lift a ratchet pawl, as will be further described herewithin.

According to the illustrated embodiment, the handle includes first, 236 and second 238 handle flanges. First handle flange 236 includes a top surface 240. Second handle flange 238 includes a top surface 242, a leading edge 244, and a trailing edge 246. In the illustrated embodiment, first top surface 240 is substantially planar, whereas second top surface 242 includes a first substantially planar region 248 and a second curved region 250.

A grip-supporting portion 252 of the handle extends from trailing edge 246 toward a rearward end 254 of the handle 112. The grip supporting portion includes surface regions adapted to support a grip as, for example, grip 204 shown in FIG. 3.

FIG. 4b shows, in perspective view, a dual sided handle 113 according to another embodiment of the invention. One of ordinary skill in the art will readily appreciate that, in various embodiments, the dual sided handle 113 is a substantially symmetrical dual sided embodiment of that previously presented FIG. 4a. In various embodiments, this symmetry serves to provide a balanced transmission of loads from a rack to a drive portion housing.

Referring again to FIG. 3 the illustrated embodiment includes a holding pawl 302 and a driving pawl 304. These pawls are shown in additional detail in FIGS. 5a-5e, and in FIGS. 6a and 6b respectively.

FIG. 5a shows, in perspective view, an exemplary holding pawl 302 according to one embodiment of the invention. Holding pawl 302 has a main body member having first 306 and second 308 side surfaces. Side surfaces 306 and 308 are, according to the illustrated embodiment, disposed in substantially parallel spaced relation to one another. Holding pawl lateral member 310 is coupled to the holding pawl main body member at side surface 306. Holding pawl lateral member 310 includes an upper surface 312 and a leading edge 314 disposed substantially perpendicular to surface 306. In various embodiments of the invention, upper surface 312 is shaped in an angled or curved configuration so as to be optimally coupled to a concave surface of a tooth, such as a rack tooth.

In the illustrated embodiment, a spring support shaft 311 is coupled to, and substantially particular to, side surface 306. In the illustrated embodiment, support shaft 311 is disposed within a through hole in surface 306. In various embodiments however, shaft 311 may be integrally formed with the holding pawl 302, welded to surface 306, or otherwise disposed and fastened in the indicated location. As will be discussed in additional detail below, support shaft 311 is adapted to support, for example, a leaf spring.

FIG. 5b shows, in perspective view, an exemplary driving pawl 304 according to one embodiment of the invention. Driving pawl 304 includes a main body member having first 356 and second 358 side surfaces. Side surfaces 356 and 358 are, according to the illustrated embodiment, disposed in substantially parallel spaced relation to one another. Driving pawl lateral member 360 is coupled to the driving pawl main body member at side surface 356. Driving pawl lateral member 360 includes an upper surface 362 including a leading edge 364 disposed substantially perpendicular to surface 356. In various embodiments of the invention, upper surface 362 is shaped in an angled or curved configuration so as to operatively coupled to a concave surface of a tooth, such as a rack tooth.

In the illustrated embodiment, a spring support shaft 361 is coupled to, and substantially perpendicular to, side surface 356. In the illustrated embodiment, support shaft 361 is disposed within a through hole in surface 356. In various embodiments however, shaft 361 may be integrally formed with the driving pawl 304, welded to surface 356, or otherwise disposed and fastened in the indicated location. As will be discussed in additional detail below, support shaft 361 is adapted to support, for example, the leaf spring mentioned above.

FIG. 5c shows, in perspective view, a portion of a further embodiment of the invention including an exemplary driving pawl 370. As shown, the driving pawl of FIG. 5c includes a further driving pawl lateral member 372. Lateral member 372 includes an upper surface 374 disposed substantially perpendicular to surface 356. In a dual-sided pawl embodiment, as shown and described below in relation to FIGS. 6a and 6b, for example, the further driving pawl lateral member 372 serves to help support first and second main body members in spaced relation to one another.

Figure 6A:
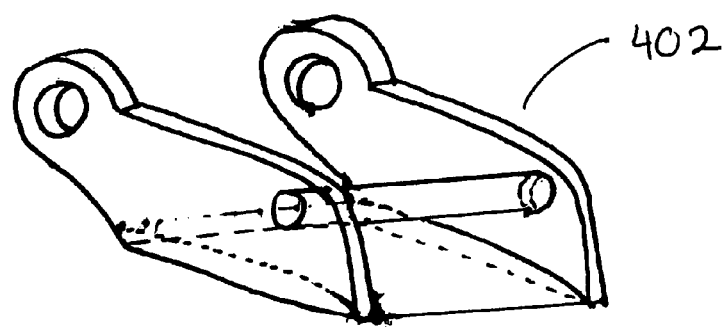
FIG. 6a shows, in perspective view, a portion of a holding pawl for a cargo bar according to yet another embodiment of the invention.
Figure 6B:
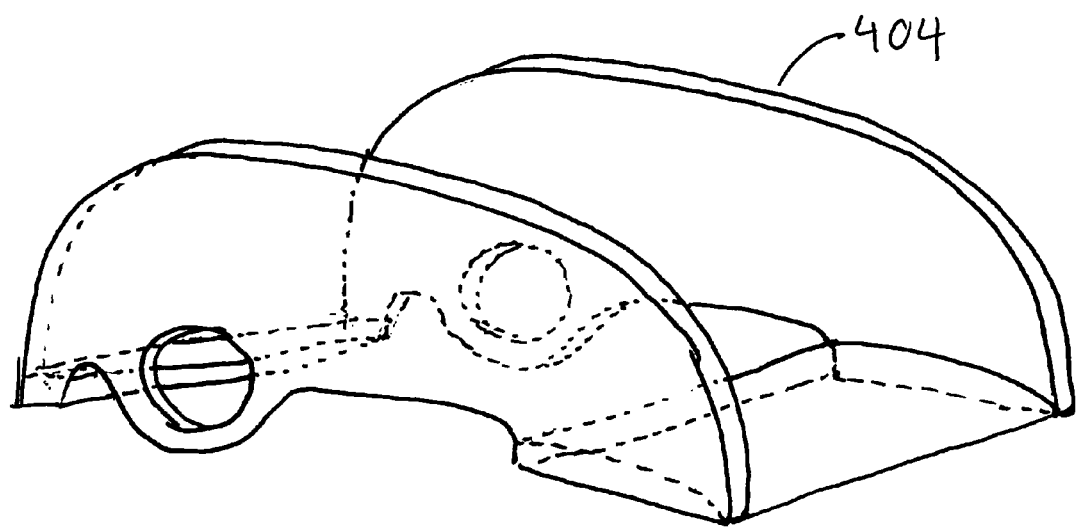
FIG. 6b shows, in perspective view, a portion of a driving pawl for a cargo bar according to still another embodiment of the invention.

FIG. 6a shows, in perspective view, a dual sided holding pawl 402 according to another embodiment of the invention. FIG. 6b shows, in perspective view, a dual sided driving pawl 404 according to another embodiment of the invention. One of ordinary skill in the art will readily appreciate that, in various embodiments, the dual sided holding pawl 402 and dual sided driving pawl 404 are substantially symmetrical dual sided embodiments of the previously presented holding pawl 302 and driving pawl 304. In various embodiments, this symmetry serves to provide a balanced transmission of loads from a rack to the drive portion housing.

Referring again to FIG. 3 the holding pawl 302 is pivotally mounted to a shaft 420. The shaft 420 is disposed transversely between, and coupled to, the side wall portions (e.g., 114). Accordingly, holding pawl 302 is also disposed between the sidewall portions. Shaft 420 is also disposed within throughhole 226 (as shown in FIG. 4a) of handle 112, so that handle 112 is also pivotally coupled between the side wall portions and shares a mutual axis of rotation with the holding pawl 302.

Driving pawl 304 is pivotally coupled to handle 112 at through-hole 230. To effect his coupling, in the illustrated embodiment, a further shaft 422 is disposed through both through-hole 234 (as shown in FIG. 4a) and through-hole 404 (as shown for example in FIG. 5c). In various embodiments, the shafts 420, 422 include one or more of a threaded screw, a solid rivet, a hollow rivet, a roll pin, a cotter pin, a hollow bar, a tube, a solid bar, a grommet, a bearing assembly such as a ball bearing assembly, a roller bearing assembly or a sleeve bearing assembly, among others.

An exemplary stopping lever is shown in FIG. 7a. The stopping lever 430 includes a lever member 432 with a longitudinal axis 434. An internal surface 434 defines a throughhole 436 between first 438 and second (not shown) surfaces. In the illustrated embodiment, the first and second surfaces are substantially planar and are disposed in substantially parallel spaced relation to one another. Through hole 436 is adapted to receive a shaft and/or bearing their within, which shaft and/or bearing serves as a fulcrum for a pivotal operative motion of the stopping lever.

The illustrated embodiment includes a grip-cap 440 having an external surface 442 and an internal surface 444. The internal surface 444 defines a cavity adapted to receive a proximal end 446 of the lever member 432 therewithin. The external surface 442 of the grip-cap is adapted to provide a comfortable frictional surface for operative contact with, for example, the thumb of an operator A distal end of the lever member 432 is shaped to include a projecting portion 448. A side surface portion 450 of the projecting portion 448 is configured for removable coupling to a detent pedestal, as described below. The lever member 432 also includes a sole surface 449 at a lower edge thereof. The sole surface 449 is adapted to be supported on a top surface of the detent pedestal, as will be described below.

FIG. 7b shows, in perspective view, a detent pedestal 452 according to one embodiment of the invention. The detent pedestal 452 is coupled to, and forms a portion of a housing portion 209, as show more clearly in FIG. 7c. The illustrated detent pedestal 452 includes first 454 and second 456 substantially planar side surfaces disposed in substantially parallel spaced relation to one another. An edge surface 458 is disposed between the side surfaces 454, 456. The edge surface 458 includes a concave region 460 adapted to removably receive projection 448 therewithin. In particular, a portion 462 of edge surface 458 within concave region 460 is adapted to be coupled to surface region 450 of stopping lever 430 (as shown in FIG. 7a).

An internal surface 464 of the detent pedestal 452 defines a through-hole between surfaces 454 and 456. According to one embodiment of the invention, the through hole is adapted to receive a fastener therethrough for coupling a first detent pedestal 452 with a second detent pedestal associated with a second housing portion. According to one embodiment, in such an arrangement, surface 456 is disposed intimately adjacent to a corresponding surface of the second detent pedestal. In various embodiments, the fastener includes one or more of a threaded screw, a solid rivet, a hollow rivet, a roll pin, a cotter pin, a hollow bar, a tube, a solid bar and a grommet, among others. This arrangement is more clearly understood with reference to FIG. 8.

The detent pedestal 452 also includes a top surface 451. The top surface 451 is adapted to support a sole surface 449 of the lever member 432.

Figure 8:
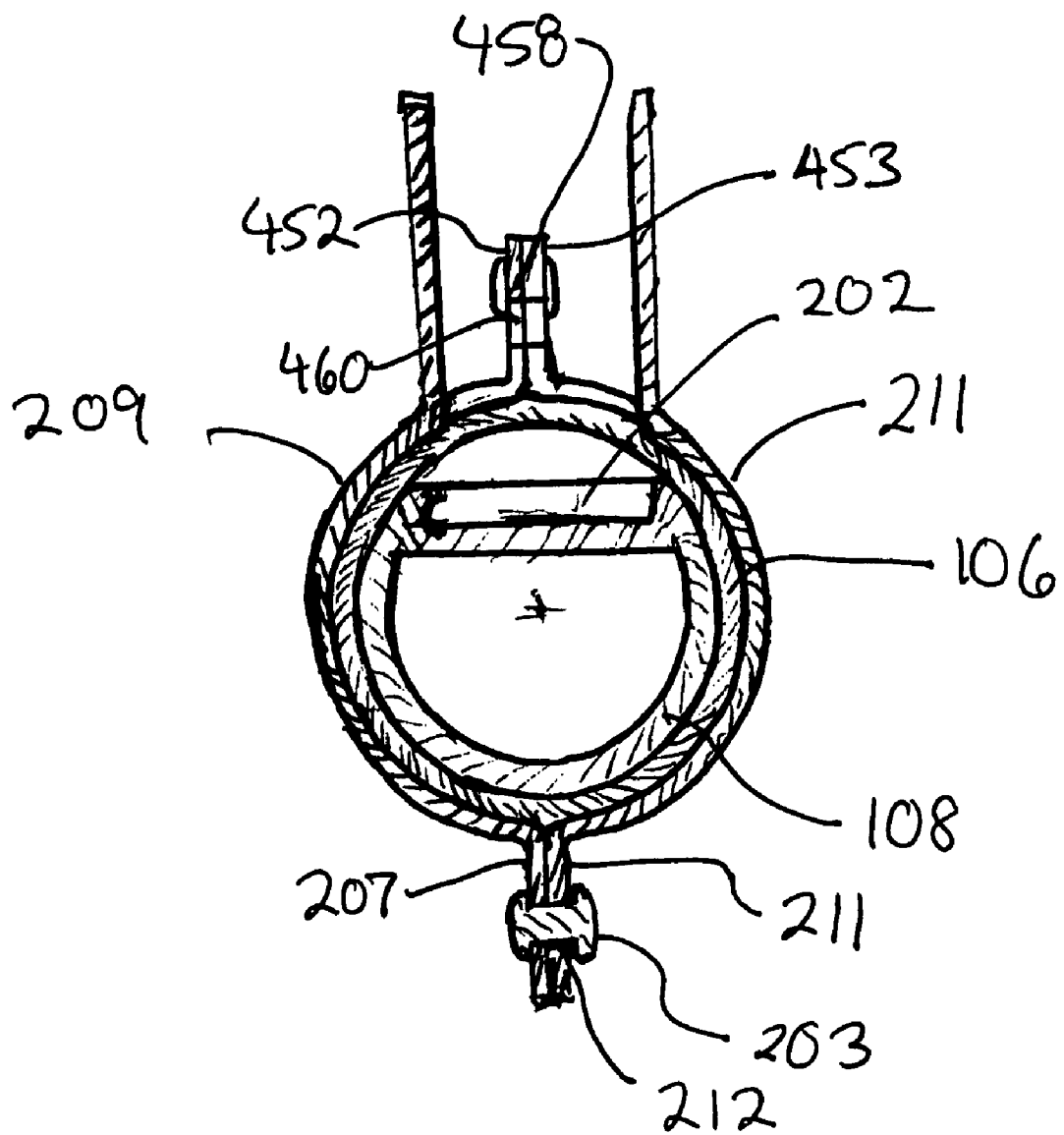
FIG. 8 shows, in cross-sectional view, a portion of a cargo bar according to one embodiment of the invention.

FIG. 8 shows a portion of one embodiment and of the invention including, in cross-sectional view, a housing portion including housing components 209 and 211. The first longitudinal member 106 is shown clamped within the housing portions 209, 211. The second longitudinal member 108 is disposed within a longitudinally oriented axial cavity within the first longitudinal member 106. As illustrated, the second longitudinal member 106 includes a rack surface portion including ratchet teeth 202. Also shown are first 211 and second 207 assembly flanges. Fastener 203, here exemplified as a rivet, is disposed within a fastener hole 212.

Also visible in FIG. 8 is a first detent pedestal 452 and a symmetrical second detent pedestal 453. Edge surface 458, including concave region 460, of the detent pedestal 452 are visible, as is a fastener 459. According to the illustrated embodiment, the fastener 459, here exemplified as a rivet, is adapted to hold the first and second detent pedestals 452, 453 in intimate contact with one another.

One of ordinary skill in the art will appreciate that the substantially circular profile illustrated with respect to the first 106 and second 108 longitudinal members is one of many possible profiles that are to be used, alone or in combination, in various and embodiments of the invention. Other possible profiles include, but are not limited to, square profiles, pentagonal profiles, hexagonal profiles, octagonal profiles, elliptical profiles, and combinations thereof.

Referring again to FIG. 3, it is apparent that in the illustrated embodiment, stopping lever 430 is pivotally coupled to handle 112 by a shaft, or a fastener configured as a shaft 480. A torsional coil spring 482 has a coil portion thereof disposed about, and coaxial to, shaft 480. A first lever arm 484 of coil spring 482 includes a distal hook disposed about hook-bearing surface region 455 of stopping lever 430. A second lever arm 461 includes a distal hook disposed about trailing edge 246 of handle flange 238.

In operation, torsional coil spring 482 acts to urge stopping lever 430 pivotally about shaft 480 and thus urge stopping lever 430 against leading edge 244 of handle flange 238. Against this urging, a user can cause stopping lever 430 to rotate counterclockwise (as viewed in FIG. 3) by applying force to external surface 442 of grip-cap 440.

In the particular configuration illustrated, the sole surface 449 of stopping lever 430 is disposed in contact with, and supported by, detent pedestal top surface 451. Consequently (as is clear from FIG. 3), further counterclockwise rotation of handle 112 about shaft 420 is substantially prevented.

In a further aspect of the illustrated embodiment, a leaf spring 490 is supported at a first end 492 by spring support shaft 361, as described above in relation to FIG. 5b and at a second end 494 by spring support shaft 311, as described above in relation to FIG. 5a. A spring control lever 496 has a proximal end 498 and a distal end 500. The proximal end 498 is adapted to be translated from one first position to another second position by the application of finger force by an operator. The distal end 500 of spring control lever 496 is disposed to impinge on leaf spring 490. The leaf spring 490 is adapted to urge driving pawl 304 and holding pawl 306 into particular spatial and functional orientations with respect to one another such that when spring control lever 496 is in the first position, activation of handle 112 tends to urge first 106 and second 108 longitudinal members coaxially away from one another, whereas when spring control lever 496 is in the second position, activation of handle 112 tends to urge first 106 and second 108 longitudinal members coaxially toward one another.

In a further aspect of the illustrated embodiment, leading edge 314 is seen to be disposed within, and coupled to, a first concave region of a first rack tooth. Leading edge 364 is seen to be disposed within, and coupled to, a second concave region of a second rack tooth.

FIGS. 9-20 show, in cross-sectional view, various operational configurations and states of cargo bar according to one embodiment of the invention. Accordingly, one of ordinary skill in the art will, upon reviewing the present disclosure in its entirety, including the figures, understand the invention and its operation, including various novel and surprising features. These novel and surprising features taken alone, and in combination, are such as would be surprising and therefore nonobvious even to one of great creativity, knowledge and skill in the art.

It should be noted that various details of the apparatus, previously described above, are omitted from FIGS. 9-20 in order to reduce the complexity of these drawings and therefore increase the clarity of presentation. One of skill in the art will readily understand that these omitted details would be present in an operational embodiment, and would understand their placement and function therein.

Figure 9:
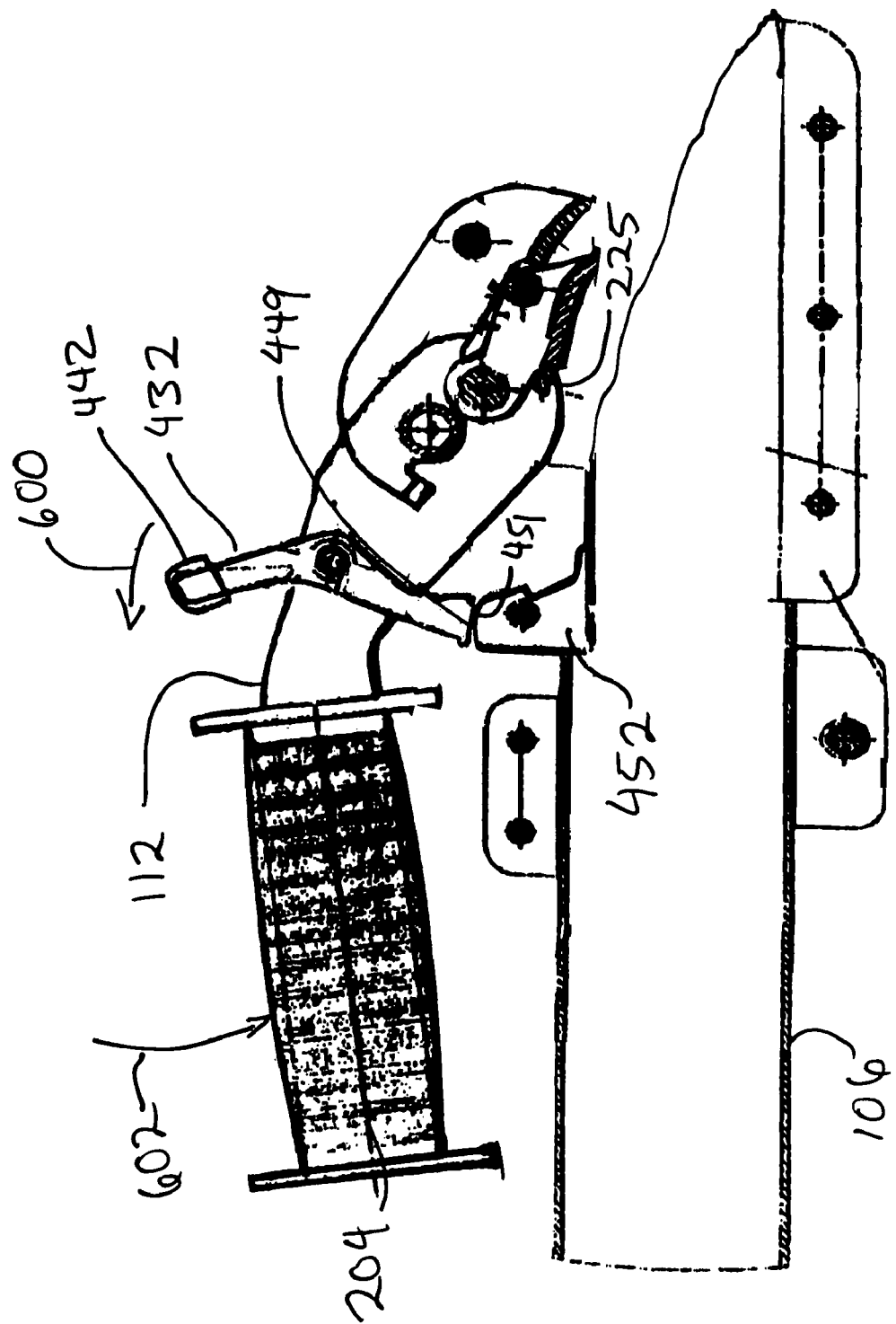
FIGS. 9-20 show, in cross-sectional view, a portion of a cargo bar according to one embodiment of the invention in various respective operational states.

For purposes of discussion, only FIG. 9 is defined to represent an initial state. It is to be understood, however, that the apparatus of the invention will enter and leave the illustrated state repeatedly during the course of its operational lifetime.

As shown in FIG. 9, a first longitudinal member 106 and various components of a drive mechanism are present. No second longitudinal member is illustrated in FIG. 9. Handle 112 is disposed in an initial orientation with respect to the drive mechanism and longitudinal member 106. Sole surface 449 of lever member 432 is disposed in contact with top surface 451 of detent pedestal 452.

Taken in sequence, FIGS. 9-17 illustrate an operation of the cargo bar including assembly of the second longitudinal member 108 into the first longitudinal member 106. Initially, a rearward force is applied by an operator to external surface 442 of the grip-cap 440 in direction 600. Concurrently and immediately thereafter, a downward force 602 is applied to an upper surface of grip 204.

Figure 10:
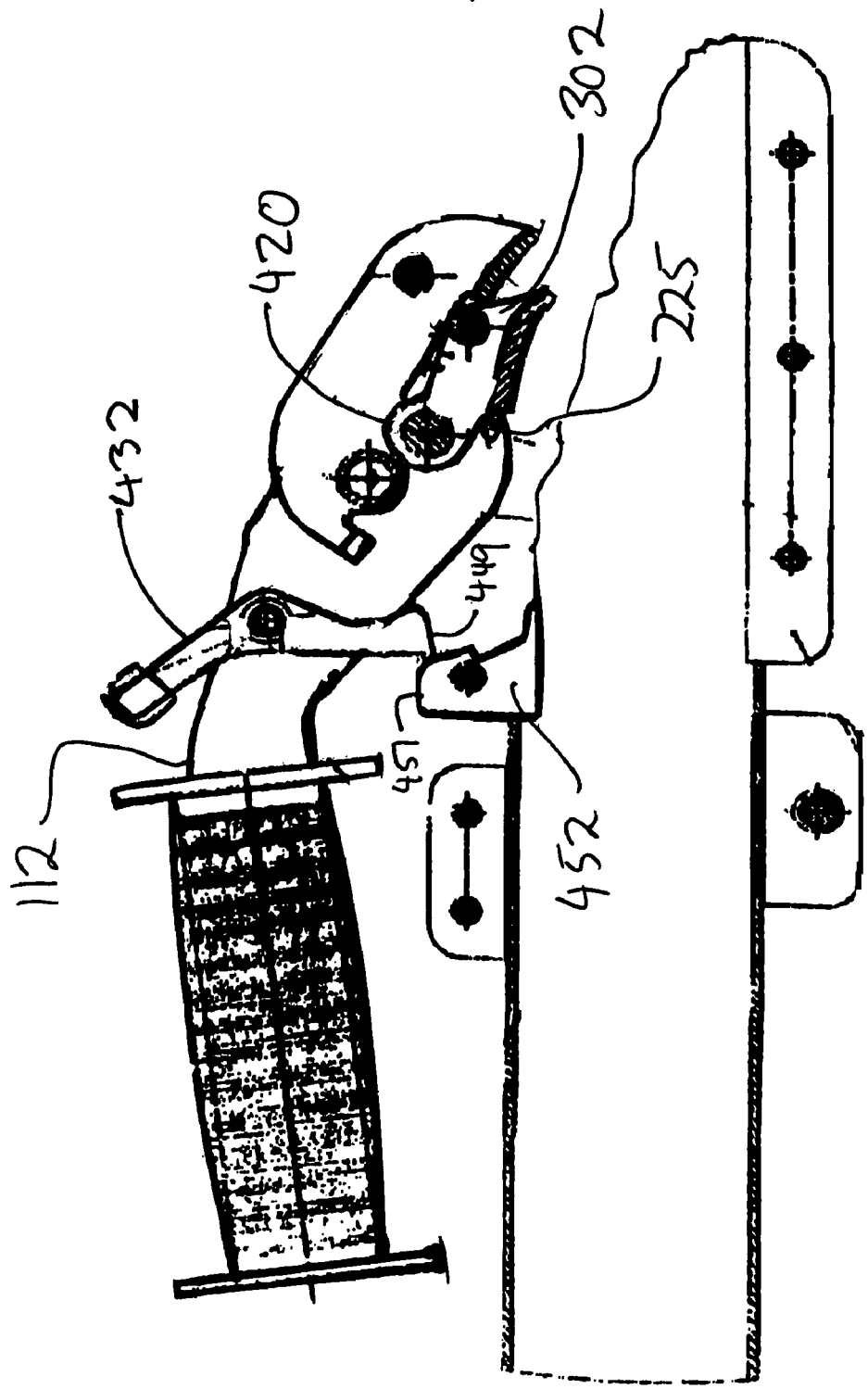

A preliminary result of this application of forces is shown in the state of the system as illustrated in FIG. 10. It will be observed that lever member 432 has rotated counterclockwise with respect to handle 112. Sole surface 449 of lever member 432 is disengaged from top surface 451 of detent pedestal 452.

In addition, it should be carefully observed that lifting shaft 225 has engaged a lower surface of holding pawl 302, thereby elevating holding pawl 302 in accordance with the counterclockwise rotation of handle 112 about shaft 420.

In consequence of the elevation of holding pawl 302, driving pawl 304 is also elevated. In various embodiments this is achieved by direct contact between the holding pawl 302 and driving pawl 304. In other embodiments, the motion of holding pawl 302 is transferred through leaf spring 490, shown and described above, so as to urge driving pawl 304 upward. Consequently, driving pawl 304 also moves upward with the pivotal rotation of handle 112 about shaft 420.

Figure 11:
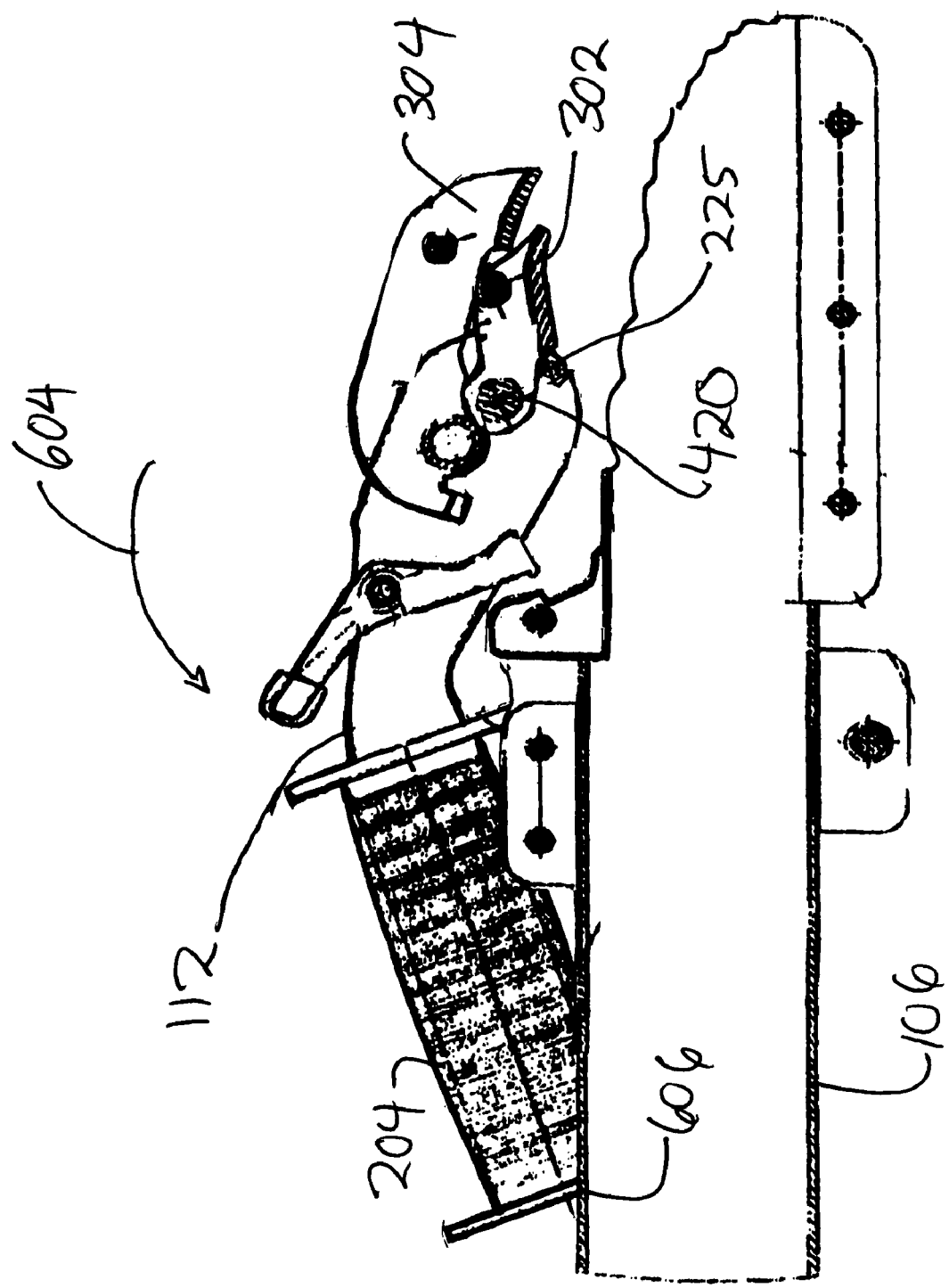

FIG. 11 shows a subsequent state of the apparatus of FIGS. 9 and 10. In FIG. 11, handle 112 has further advanced in its counterclockwise rotation 604 about shaft 420. Holding pawl 302, and consequently driving pawl 304, has progressed further upward, under the urging of lifting shaft 225.

It should be noted that, in the presently illustrated embodiments, handle 112, and in particular grip 204, is seen to dip below the level of an upper surface 606 of longitudinal member 106. In the illustrated embodiment, this is achieved by having a single-sided handle 112 move downward adjacent to longitudinal member 106. One of ordinary skill in the art will readily appreciate, however, that in other embodiments of the invention, the dimensions and placement of the components are to be arranged such that the extreme end of handle 112 remains always above the level of surface 606, thereby enabling the use of, for example, a double-sided handle, such as that shown in FIG. 4b.

Figure 12:
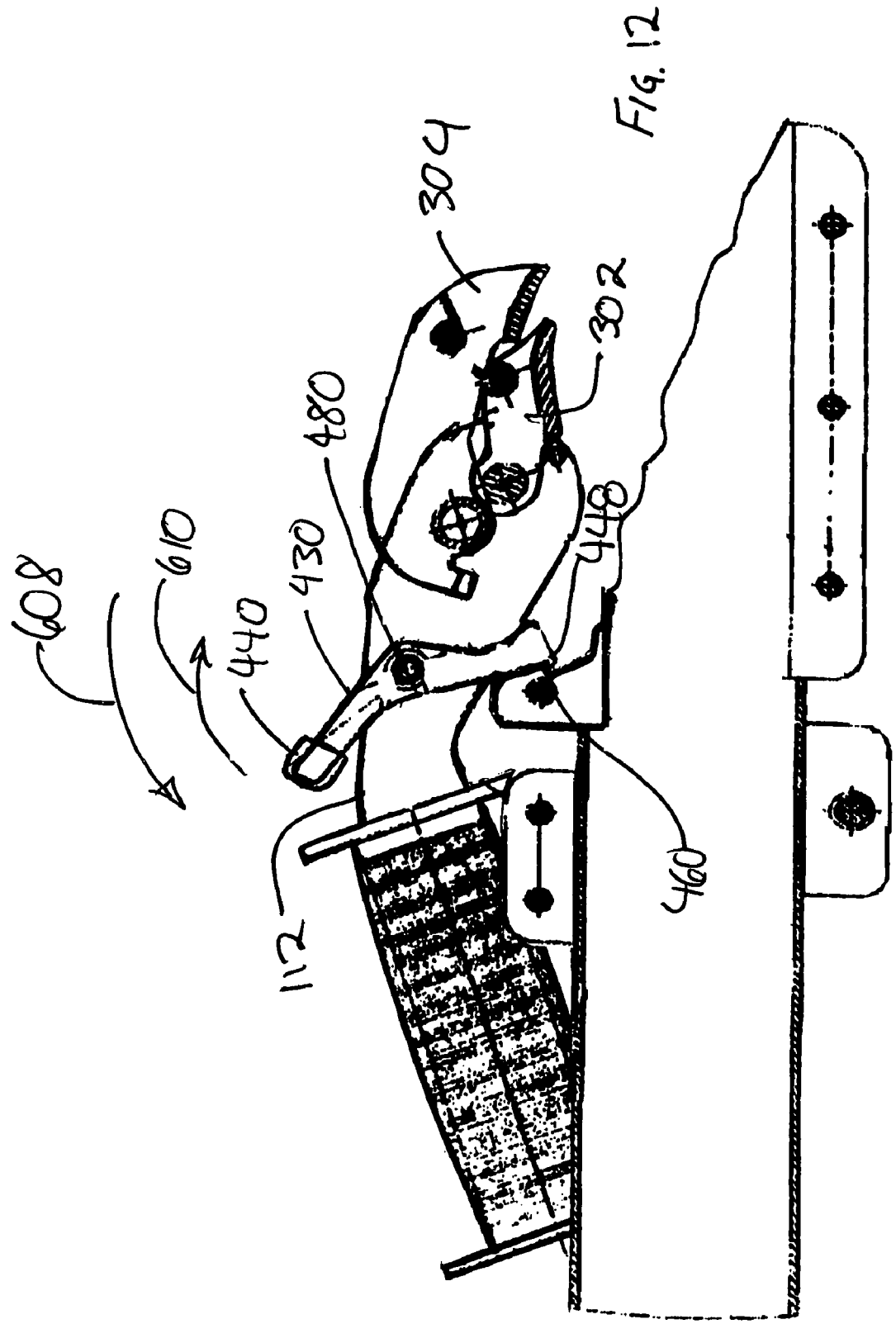

In FIG. 12, the handle 112 has further completed its counter clockwise rotation 608 and achieved an orientation whereby concave region 460 receives projection 448 therewithin. At this point, the operator releases the grip-cap 440. Under the urging of the torsional coil spring (illustrated and described above) stopping lever 430 rotates clockwise 610 about shaft 480, thereby latching stopping lever 430 to detent pedestal 452. This in turn latches handle 112, as well as holding pawl 302 and driving pawl 304 in the illustrated orientation. In this position, an axial aperture within first longitudinal member 106 is unobstructed by the pawls 302, 304.

Figure 13:
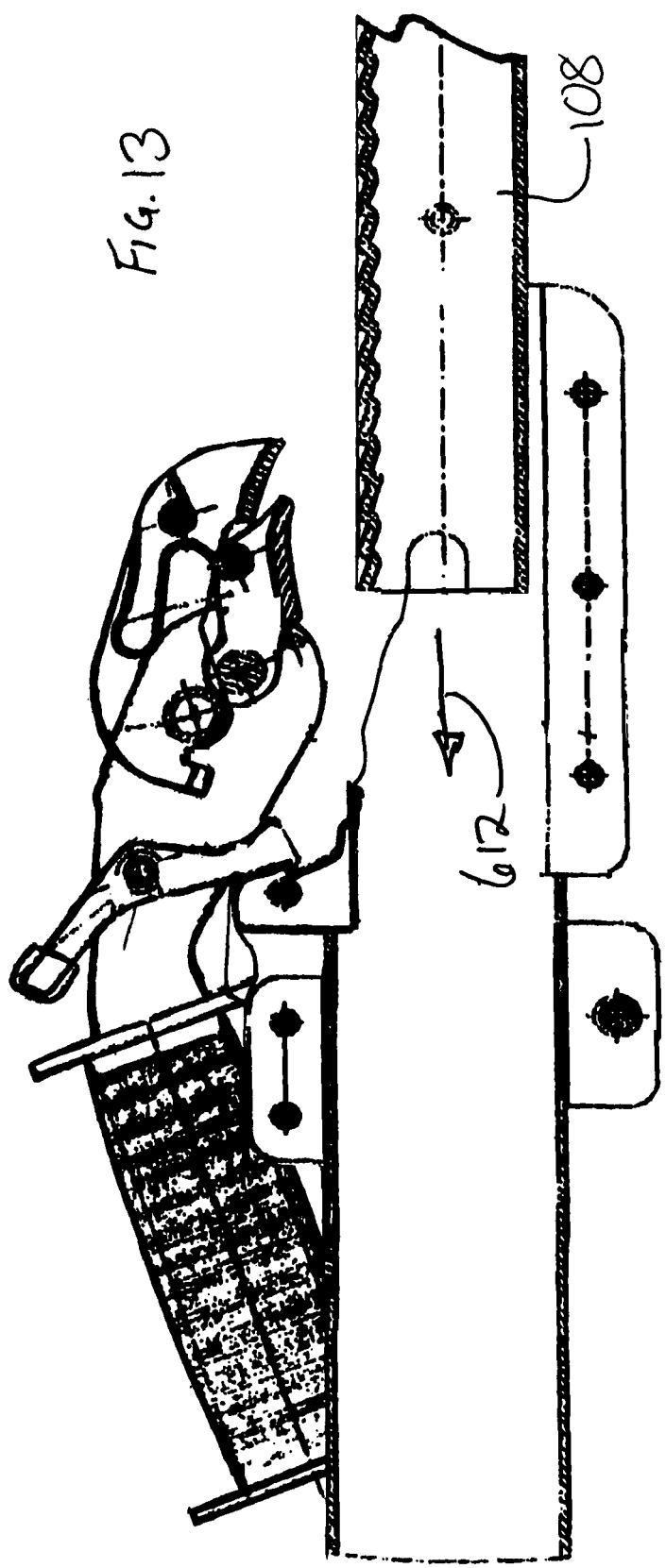
Figure 14:
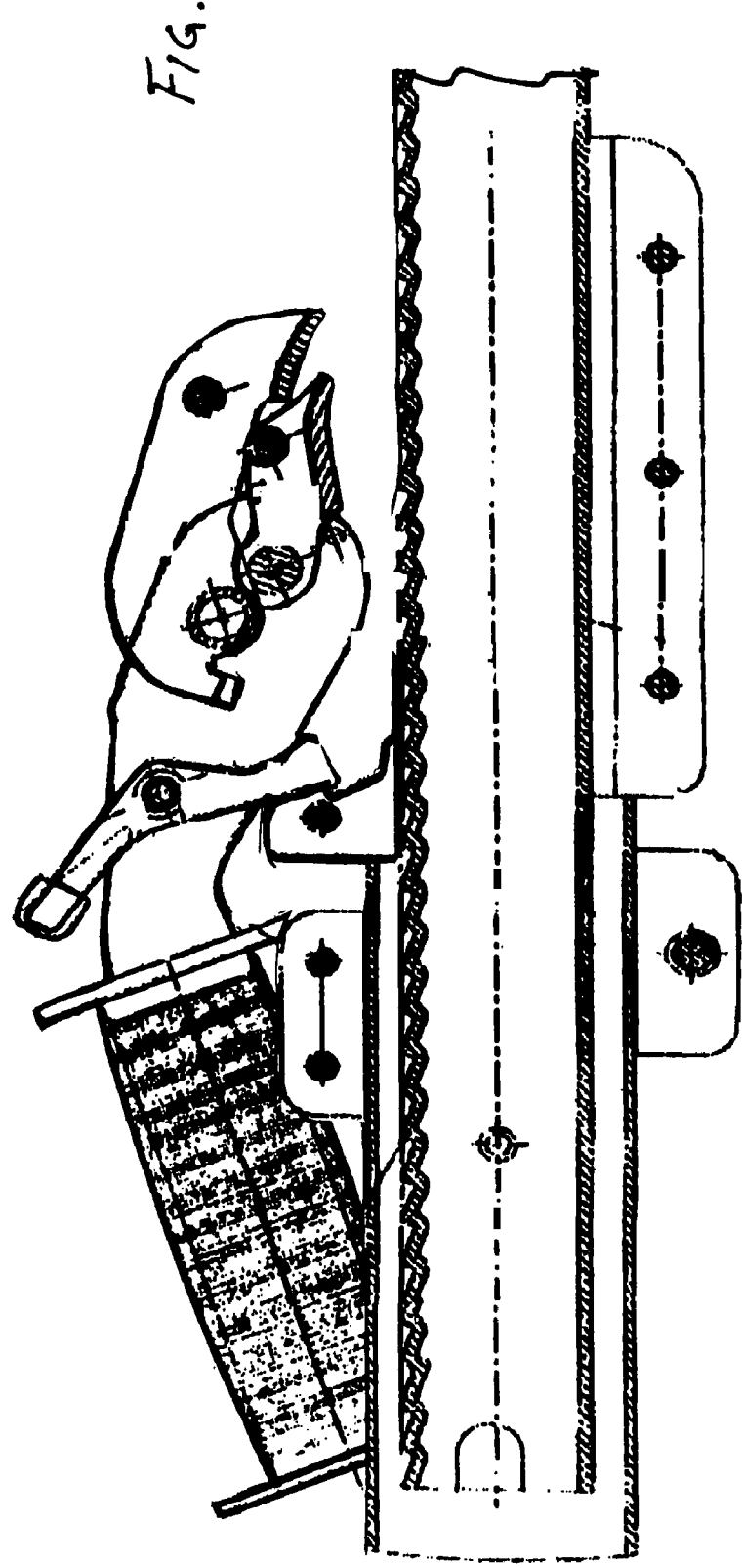
Figure 15:
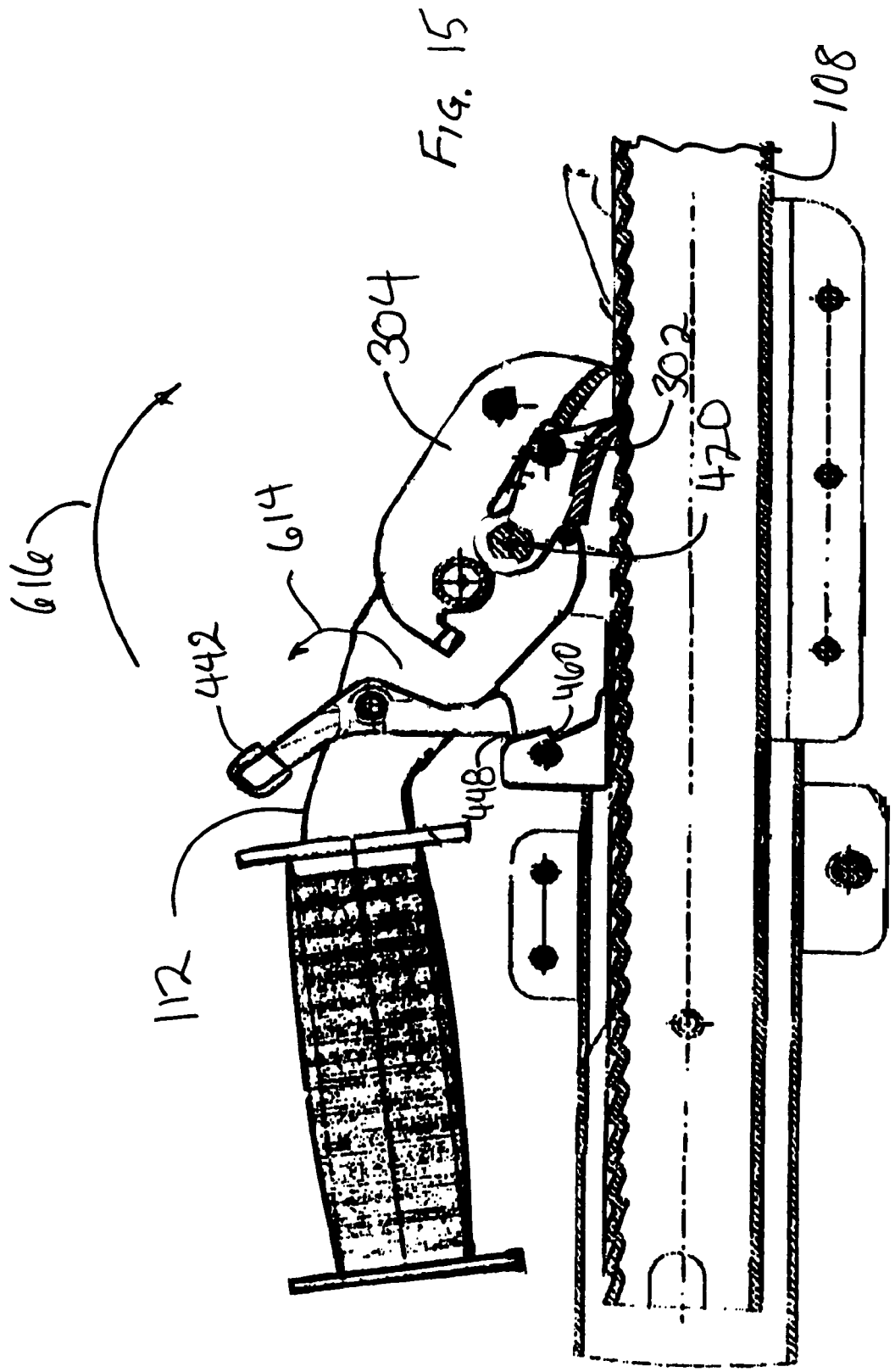

Thereafter, as shown in FIG. 13, second longitudinal member 108 may be readily inserted 612 coaxially within the driving mechanism and within first longitudinal member 106. In this condition, the relative positions of the first and second longitudinal members can be easily adjusted into a desired general placement and orientation of the cargo bar as shown, for example, in FIG. 1. An exemplary illustration of the relationship between the first and second longitudinal members when in this condition is provided in FIG. 14.

Subsequently, as shown in FIG. 15, force is again applied by the operator to the external surface 442 of the grip-cap. Responsively, the grip-cap rotates 614 against the urging of the torsional coil spring so as to disengage the projection 448 from the concave region 460. Handle 112 rotates clockwise 616 about shaft 420. Consistently with his rotation, holding pawl 302 and driving pawl 304 moves downwardly to engage respective rack teeth of the second longitudinal member 108.

Figure 16:
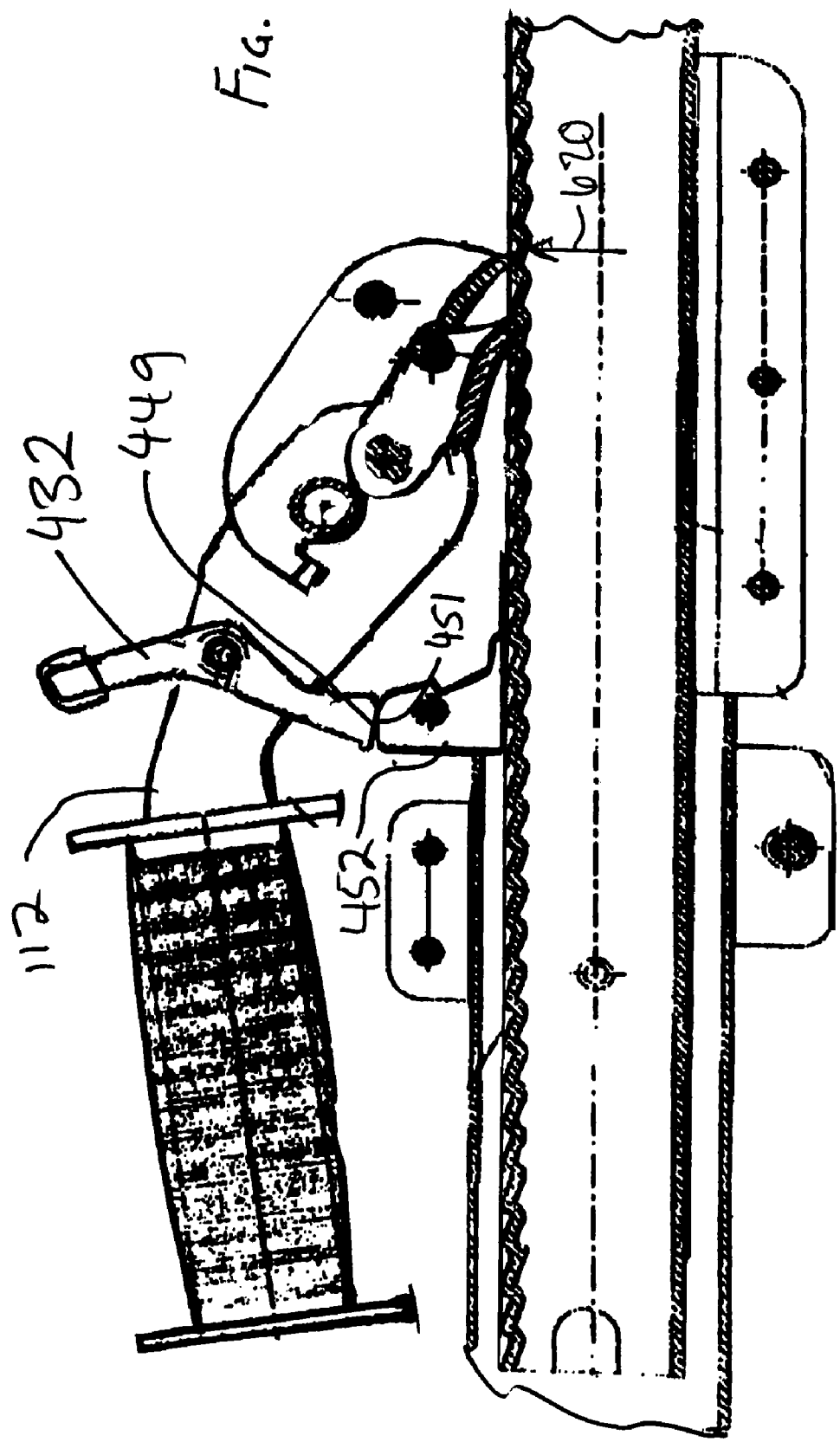

FIG. 16 shows the system in a representative state at the conclusion of the above-described exemplary cycle. Handle 112 is substantially restored to its original orientation as shown in FIG. 9 (although one of skill in the art will appreciate that some variation, due to the location of the ratchet pawls is possible). Further, the sole surface 449 of lever member 432 is once again fully engaged with top surface 451 of detent pedestal 452. As will be understood by one of ordinary skill in the art, this orientation of lever member 432 prevents inadvertent rotation of the handle 112 through the above-described cycle in a way that would undesirably disengage the ratchet pawls from the rack.

Figure 17:
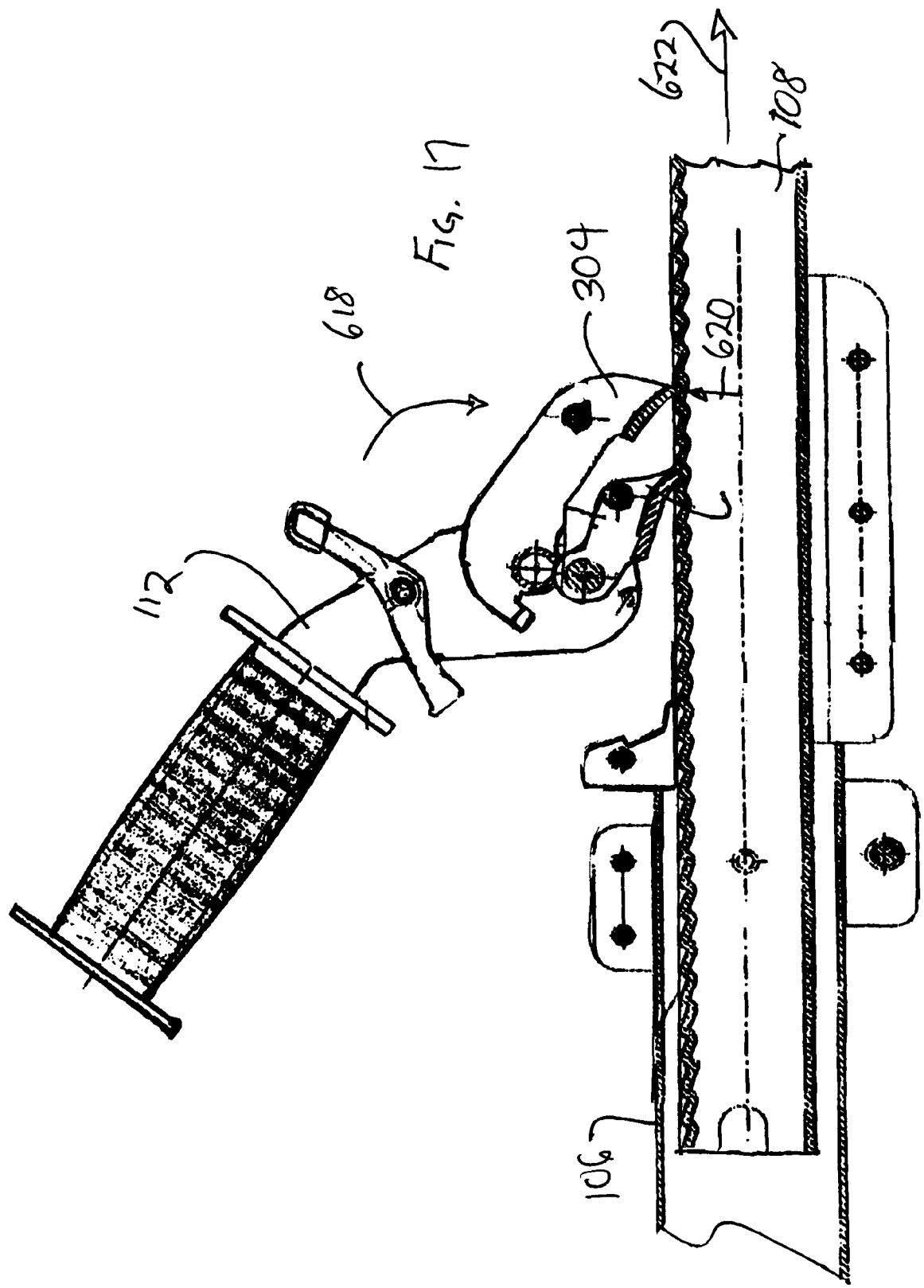
Figure 18:
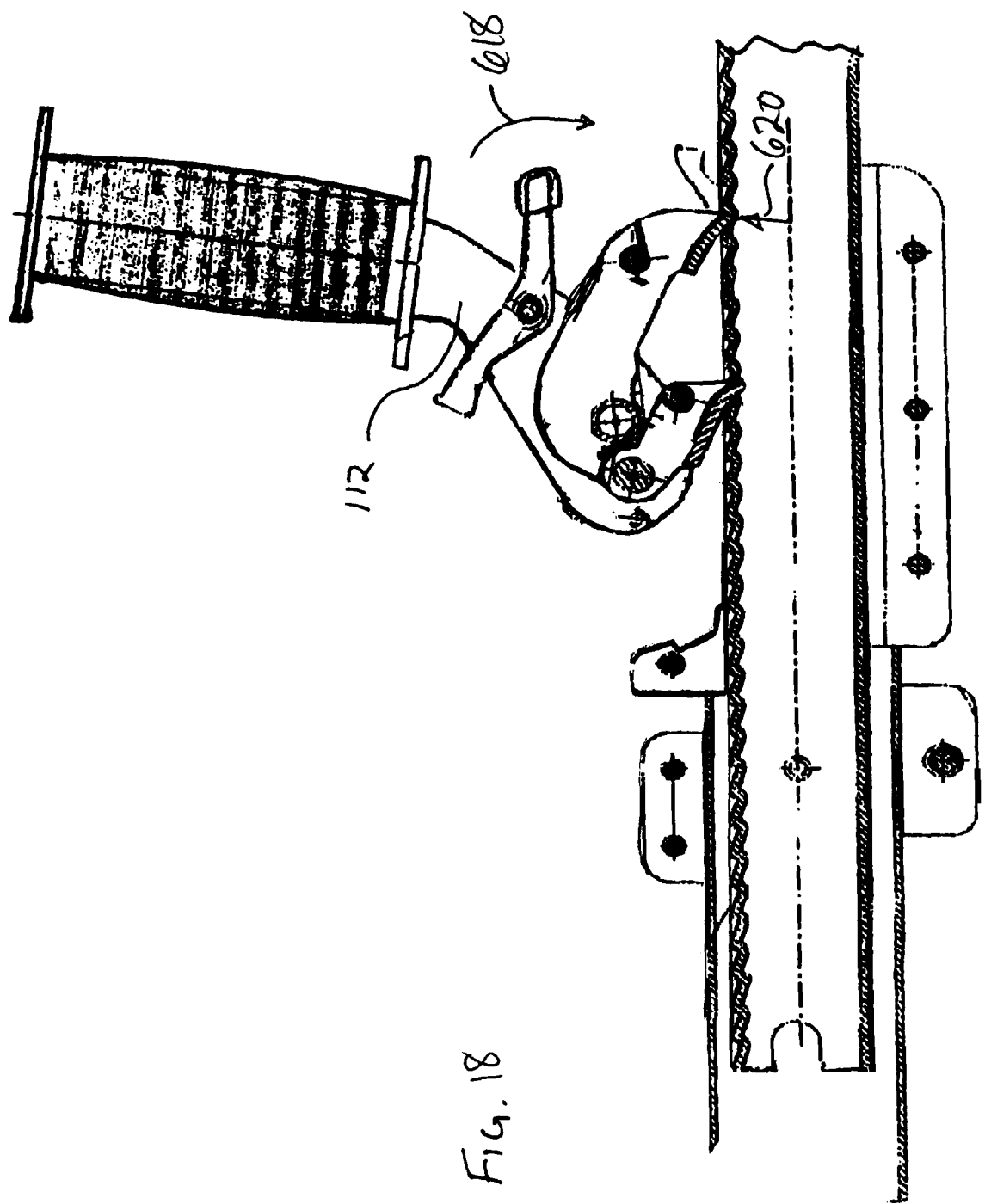

FIGS. 17-20 show an exemplary driving cycle of the cargo bar according to one embodiment of the invention. One of ordinary skill in the art will readily appreciate that, as shown in FIGS. 17 and 18, as handle 112 is rotated clockwise 618, driving pawl 304 engages a single rack tooth 620, urging longitudinal member 108 axially away 622 from longitudinal member 106. During his motion 622, holding pawl 302 deflects the leaf spring (described above) and moves substantially freely with respect to the rack teeth. As shown in FIG. 18, by the completion of rotation 618 rack tooth 620 has moved rightward from its original position.

Figure 19:
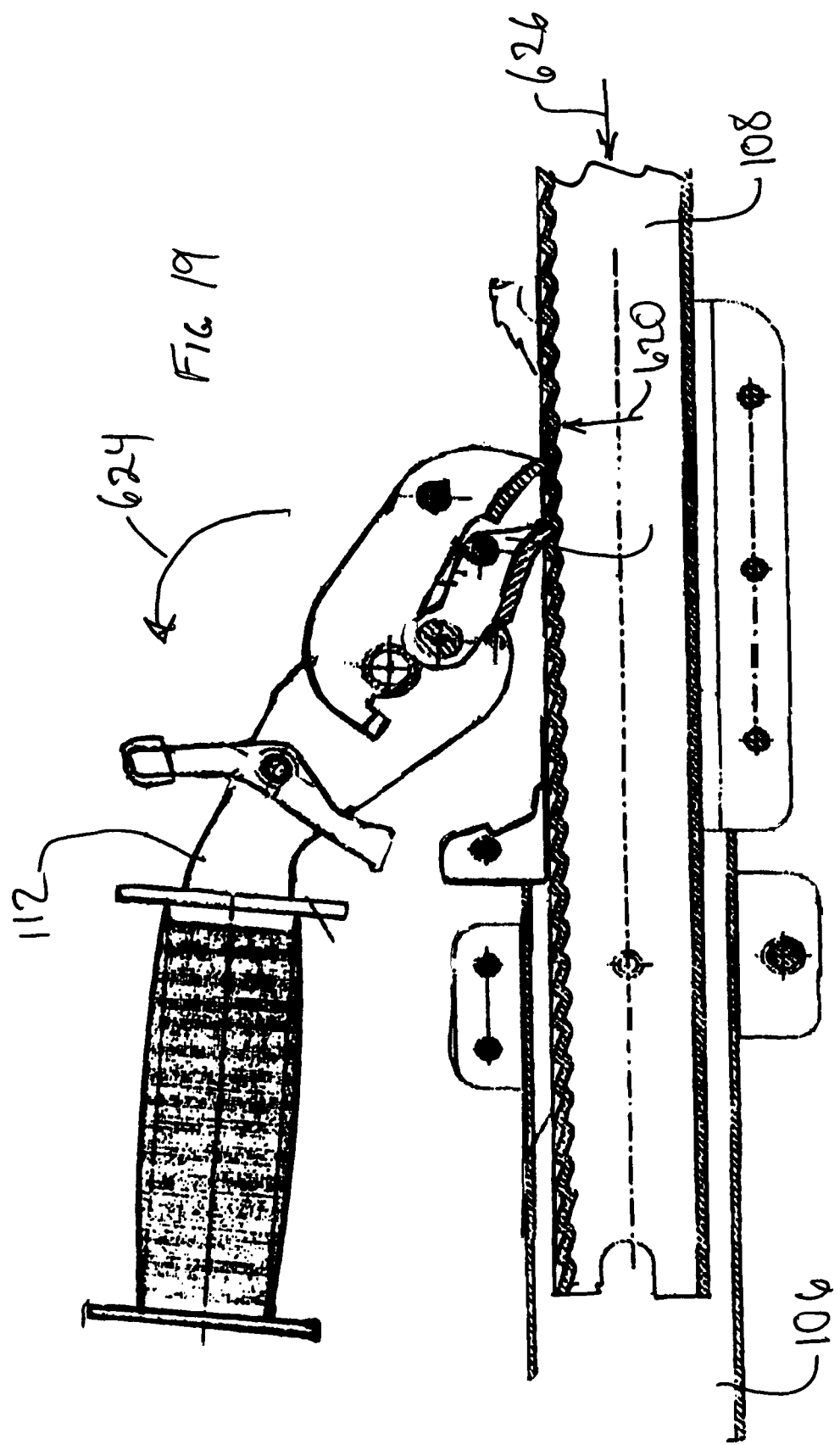
Figure 20:
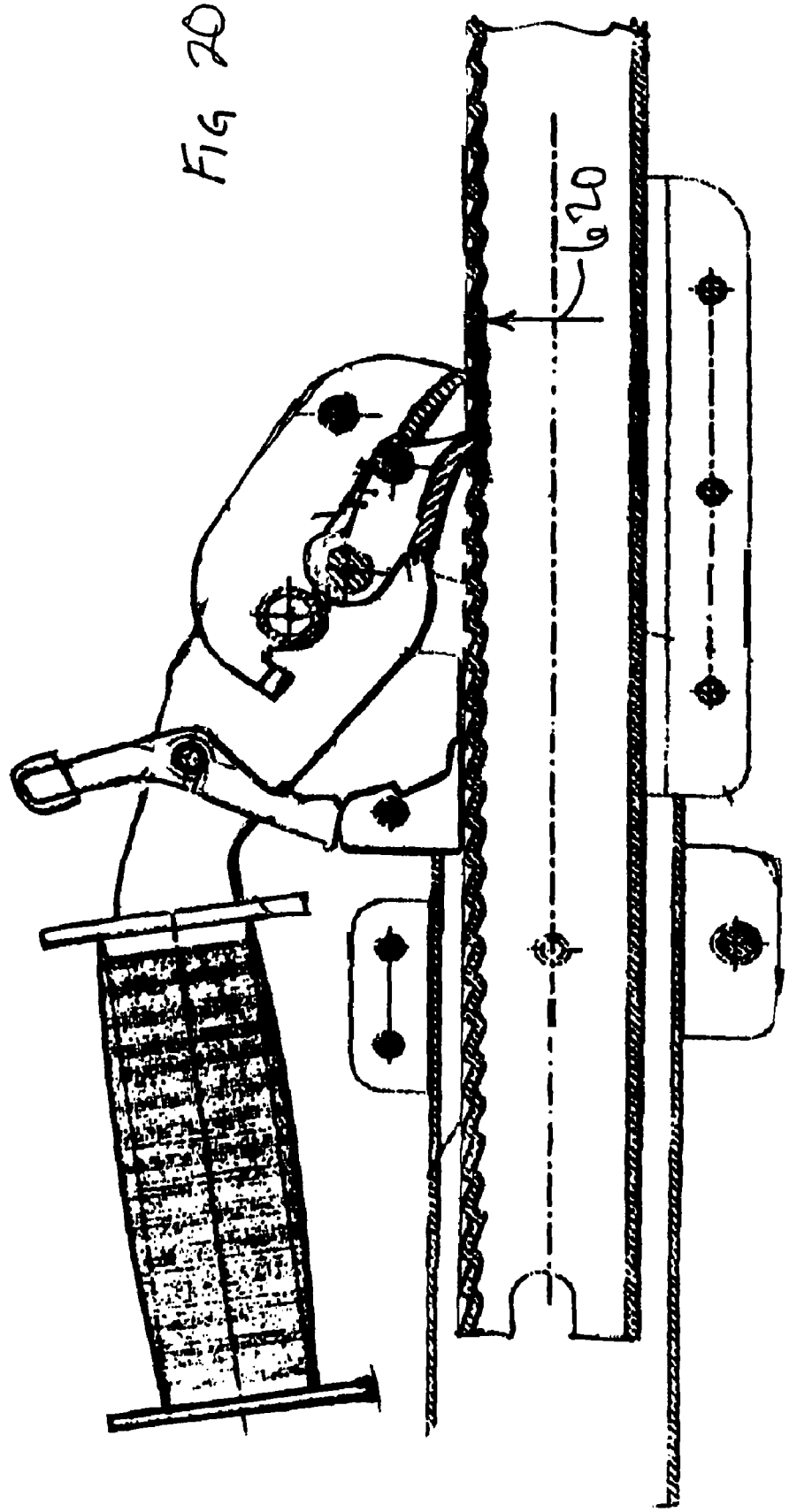

Referring now to FIGS. 19 and 20, during a subsequent counterclockwise rotation 624 of handle 112, the position of longitudinal member 108 with respect to longitudinal member 106 is held substantially constant by the engagement of holding pawl 302 with the teeth of the rack.

One of ordinary skill in the art, with some knowledge of previous devices, will appreciate that by manipulation of spring control lever 496 (as shown in, and described in relation to, FIG. 3), the direction of operation can be reversed. Thus a cycling of handle 112 as shown in FIGS. 16-20 will result in a rightward motion 626 of longitudinal member 108 with respect to longitudinal member 106.

Surprisingly and significantly, in view of the long development of cargo bars, and the many creative inventors who have addressed the problem thereof, the present invention provides a further novel and improved release mechanism. Specifically, by operation of the lever member 432 and handle 112 as illustrated in FIGS. 9-16, the engagement of the pawls with the rack may be immediately released, thereby allowing the longitudinal members 106, 108 to move relative to one another, and releasing compressive forces between the cargo bar and, for example, the walls of a container. This action, which would clearly surprise one familiar with the operation of cargo bars, allows the rapid removal and redeployment of a device according to the invention.

In addition, a further performance of the cycle illustrated in FIGS. 9-16 allows disassembly of a cargo bar for storage or other purposes as illustrated, for example, in FIG. 2.

Having been led to an understanding of the need for an improved rapid-release mechanism for a cargo bar, and having thus come to understand the remarkable and surprising benefits of such a mechanism, one of skill in the art will now appreciate that other embodiments of a rapid release cargo bar are possible. In particular, it is possible to have other embodiments of a cargo bar which will release a compressive tension and allow redeployment of the bar without extensive monotonic or cyclical motion of an activation handle (as in 112). Such embodiments include a cargo bar including a rack and pinion gear wherein the pinion gear is readily disengageable from the rack, a screw, readily disengageable from adjacent threads and a nut readily disengageable from an internal screw, among others.

While the exemplary embodiments described above have been chosen primarily from the field of transportation of goods, one of skill in the art will appreciate that the principles of the invention are equally well applied, and that the benefits of the present invention are equally well realized, in a wide variety of other systems including, for example, manufacturing and storage systems. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the claims appended hereto.

The invention claimed is:

1. A cargo brace comprising:
a pivotally mounted drive handle, said pivotally mounted drive handle being adapted to rotate within a first angular region to activate said cargo brace and said pivotally mounted drive handle being adapted to rotate within a second angular region to deactivate said cargo brace; and
a stopper, said stopper being adapted to prevent an accidental rotation of said pivotally mounted drive handle within said second angular region.

2. A cargo brace as defined in claim 1 wherein said stopper comprises a pivotally mounted lever.

3. A cargo brace as defined in claim 2 wherein said pivotally mounted lever is substantially non-removably coupled at a fulcrum to said pivotally mounted drive handle.

4. A cargo brace as defined in claim 1 wherein said stopper is adapted to be placed in compression so as to prevent said accidental rotation.

5. A cargo brace as defined in claim 1 further comprising a detent pedestal, said detent pedestal including a first surface adapted to support a corresponding second surface of said stopper.

6. A cargo brace as defined in claim 5 wherein said pivotally mounted drive handle is adapted to rotate within said second angular region only when said first surface is disengaged from said second surface.

7. A cargo brace as defined in claim 1 wherein said stopper is substantially permanently pivotally coupled to said pivotally mounted drive handle.

\* \* \* \* \*